United States Patent
Yu et al.

(10) Patent No.: US 9,729,495 B2
(45) Date of Patent: Aug. 8, 2017

(54) ORDERING CONTENT ITEMS IN A FEED BASED ON HEIGHTS ASSOCIATED WITH THE CONTENT ITEMS

(71) Applicant: Facebook, Inc., Menlo Park, CA (US)

(72) Inventors: Yintao Yu, Mountain View, CA (US);
Meihong Wang, Sunnyvale, CA (US);
Yi Tang, Mountain View, CA (US);
Wenjie Fu, Foster City, CA (US);
Hong Ge, Cupertino, CA (US)

(73) Assignee: Facebook, Inc., Menlo Park, CA (US)

(*) Notice: Subject to any disclaimer, the term of this patent is extended or adjusted under 35 U.S.C. 154(b) by 241 days.

(21) Appl. No.: 14/675,009

(22) Filed: Mar. 31, 2015

(65) Prior Publication Data

US 2016/0291805 A1    Oct. 6, 2016

(51) Int. Cl.
*G06F 3/048* (2013.01)
*H04L 12/58* (2006.01)
*G06Q 50/00* (2012.01)
*G06Q 30/02* (2012.01)

(52) U.S. Cl.
CPC ............ *H04L 51/32* (2013.01); *G06Q 30/02* (2013.01); *G06Q 50/01* (2013.01)

(58) Field of Classification Search
CPC ............... G06F 3/0482; G06F 17/3089; G06F 17/30828; G06Q 30/02; H04L 51/32
USPC .................................................. 715/738, 774
See application file for complete search history.

(56) References Cited

U.S. PATENT DOCUMENTS

| | | | |
|---|---|---|---|
| 8,510,379 B2* | 8/2013 | Howes | G06Q 10/10 709/204 |
| 2011/0153646 A1* | 6/2011 | Hong | G06F 17/3089 707/769 |

* cited by examiner

*Primary Examiner* — Andrey Belousov
(74) *Attorney, Agent, or Firm* — Fenwick & West LLP

(57) ABSTRACT

A social networking system selects and presents content items to a user via a feed. Additionally, the social networking system predicts heights associated with various content items, such as content items selected for presentation via the feed. Characteristics of a content item (e.g., a type of content included in the content item, a language of the content item, and a number of comments associated with the content item) as well as characteristics of a client device associated with the user are used to predict a height associated with the content item. When selecting content items for presentation to the user, the social networking system accounts for the predicted heights of various content items when ordering the content items in the news feed.

20 Claims, 4 Drawing Sheets

ORDERING CONTENT ITEMS IN A FEED BASED ON HEIGHTS ASSOCIATED WITH THE CONTENT ITEMS

BACKGROUND

This disclosure relates generally to social networking systems, and in particular to presenting content to users of a social networking system via a feed.

Users of a social networking system share their interests and engage with other users of the social networking system by sharing or generating content items such as photographs, status updates, and playing social games. While this allows users to easily exchange information with other social networking system users, the amount of information gathered from users is staggering. This causes a social networking system to receive a large amount of information from users describing a wide range of events ranging from events including recent moves to a new city, graduations, births, engagements, marriages, and the like, as well as more mundane content such as status messages, information about what music has been listened to by users, and recent check-in events at coffee shops.

A social networking system presents various content items to a user based on the information it receives from other users. For example, the social networking system presents a user with content items describing various actions performed by other social networking system users. Additionally, entities (e.g., a business) may present content items to online system users via the feed of content item along with the content items based on information received from other users to gain public attention for products or services or to persuade social networking system users to take an action regarding products or services provided by the entity. Because of the large amount of information received by a social networking system, a large number of content items may be presented to a user. However, because users often use different devices and/or applications, such as web browsers, with different display characteristics to view feeds provided by social networking systems, content items and advertisements in a feed appear in different sizes on different devices. This may be inconvenient to users viewing the feed provided by a social networking system and may cause a feed presented to users to be differently presented by different client devices, which may increase the difficulty for the user to identify content of interest in the feed.

SUMMARY

A social networking system presents content items to a user of the social networking system via a news feed. Content items presented via the news feed include news feed stories describing actions of other social networking system users and sponsored content items, such as advertisements. The social networking system scores content items. In various embodiments, the news feed stories and sponsored content items (i.e., advertisements) are differently scored. For example, the social networking system scores a news feed story based on an expected amount of user interaction with the news feed story. The expected amount of user interaction is a measure of the probability of the user interacting with the news feed story. In some embodiments, the social networking system scores an advertisement based at least in part on a bid amount associated with the advertisement and an expected amount of user interaction with the advertisement. For example, an expected value is determined for an advertisement based on the bid amount associated with the advertisement and the expected amount of user interaction with the advertisement, and the score for the advertisement is based at least in part on the bid amount.

Based on the scores, the social networking system selects a set of candidate content items for presentation to the user via the news feed. In one embodiment, the social networking system ranks the content items based on their associated scores and selects the set of candidate content items based on their associated ranking. For example, the set of candidate content items includes content items having at least a threshold position in the ranking. When the social networking system identifies the set of candidate content items, the social networking system also predicts a height associated with each candidate content item. For example, the social networking system predicts a height associated with a candidate content item based on the content included in the candidate content item, such as text or images. In one embodiment, the social networking system uses a prediction model to predict heights associated with the candidate content items.

The prediction model used to predict the height associated with a candidate content item may be based on characteristics of the candidate content item. Characteristics of a candidate content item used to predict the height of the candidate content item include: the height of the candidate content item is based on content included in the candidate content item (e.g., image data, video data, text data), a language associated with the content item, and a number of comments associated with the candidate content item. Additionally, information describing a client device on which a candidate content item is to be presented is also used to predict the height of the candidate content item. For example, the social networking system determines one or more dimensions of a display device used to present the candidate content item based on a client device associated with the user to whom the candidate content item is to be presented by the social networking system.

Based at least in part on the predicted heights of candidate content items, the social networking system orders the selected content items within the news feed. In some embodiments, the social networking system determines a value of presenting a candidate content item in different positions of the news feed. The value is based in part on the score of the candidate content and provides a measure of an expected amount of interaction with the content item when presented in a position of the news feed. Additionally, the value accounts for a decrease in value to the social networking system from positioning additional candidate content items in positions of the news feed below the position in which the candidate content item is presented. To account for the decrease in value from presenting the additional candidate content items in positions below the position in which the candidate content item is presented, the social networking system applies a position discount to the value of the presenting the candidate content in the position of the news feed. A position discount value is associated with a position in the news feed and reflects a predicted decrease in user interaction with a content item based on the position of the content in the news feed.

When a news feed is presented to a user, the likelihood of a user interacting with a content item presented via the news feed varies depending on the position in the news feed in which the content item is presented. Positions of the news feed may be determined based on a distance between the content item and a reference position, such as an upper boundary of the news feed. For example, a user has a higher likelihood of interacting with content items presented in positions within a threshold distance from an upper boundary (or "top") of the news feed than of interacting with content items presented in positions greater than the threshold distance from the news feed. The position discount value associated with a content item may be based at least in part on a distance between the content item and a reference position in the news feed, such as the upper boundary of the news feed. For example, different position discounts are associated with different distances between a content item and the upper boundary of the news feed, so a distance between the content item and the upper boundary determines the position discount applied to a score associated with the content item.

The social networking system may determine different values associated with a candidate content item by modifying a score of the candidate content item by different position discounts associated with different distances between the candidate content item and the upper boundary of the news feed. The different distances may be determined by combining predicted heights of other candidate content items. In some embodiments, the social networking system orders the candidate content items by associating candidate content items with distances from the upper boundary of the news feed so a combination of values associated with candidate content items associated with distances from the upper boundary of the news feed is maximized.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
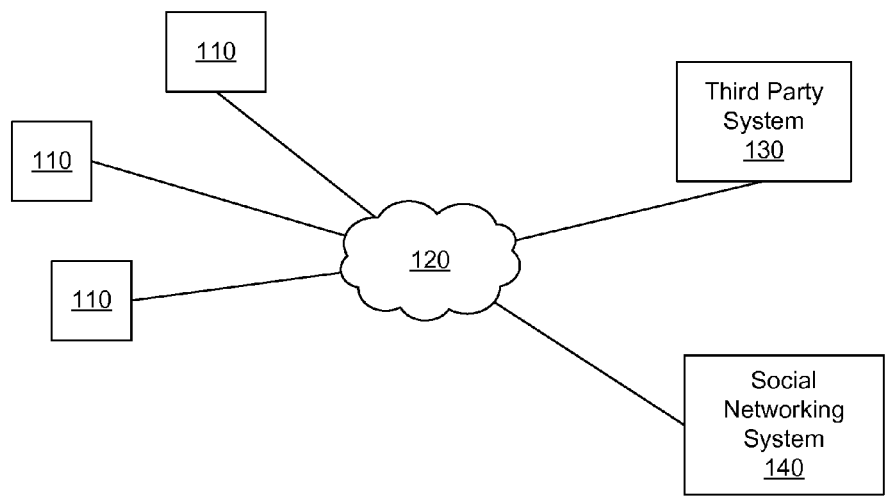
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
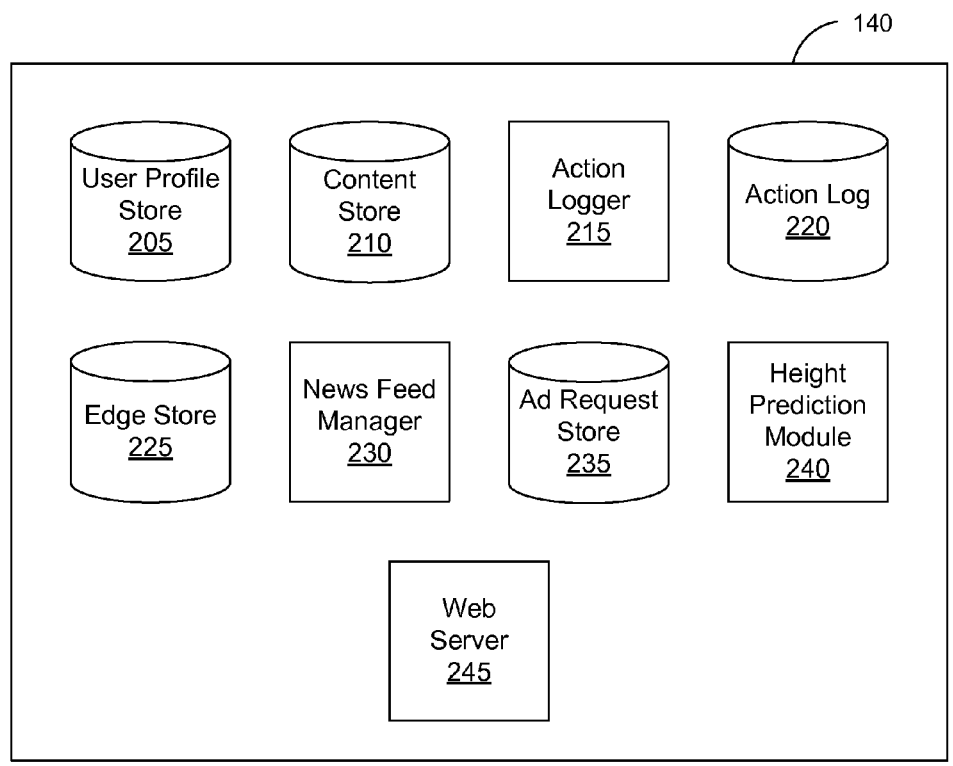
FIG. 2 is a block diagram of a social networking system, in accordance with an embodiment.

FIG. 2 is an example block diagram of an architecture of the social networking system 140. The social networking system 140 shown in FIG. 2 includes a user profile store 205, a content store 210, an action logger 215, an action log 220, an edge store 225, news feed manager 230, an advertisement ("ad") request store 235, a height prediction module 240, and a web server 245. In other embodiments, the social networking system 140 may include additional, fewer, or different components than those described in conjunction with FIG. 2. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, and checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest an object or in another user in the social networking system 140 based on the actions performed by the user. A user's affinity may be computed by the social networking system 140 over time to approximate a user's interest for an object, a topic, or another user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the social networking system 140 identifies stories and other content items, such as advertisements, likely to be of interest to a user through a "news feed" presented to the user. A news feed story presented to a user describes an action taken by an additional user connected to the user and identifies the additional user. Additionally, a news feed story may describe objects represented in the social networking system 140, such as an image, a video, a comment from a user, a status message, an external link, content generated by the social networking system 140, an application, a game, or other types of content items maintained by the content store 210. In some embodiments, a news feed story describing an action performed by a user may be accessible to users who are not connected to the user that performed the action. The news feed manager 230 may generate stories for presentation to a user based on information in the action log 220 and in the edge store 225 or may select candidate organic news feed stories included in content store 210. One or more of the candidate organic news feed stories are selected and presented to a user by the news feed manager 230.

The news feed manager 230 generates the organic news feed stories for presentation in a news feed, selects content items for presentation via the news feed, and communicates the news feed to one or more client devices 110 for presentation to users. For example a web browser executing on a client device 110 or an application executing on the client device 110 and associated with the social networking system 140 presents a news feed received from the social networking system 140. An example of generating a news feed is further described in U.S. patent application Ser. No. 14/031,453, filed on Sep. 19, 2013, which is hereby incorporated by reference in its entirety. In one embodiment, the news feed manager 230 receives a request to present one or more organic news feed stories to a social networking system user from an application executing on a client device 110 and accesses one or more of the user profile store 205, the content store 210, the action log 220, and the edge store 225 to retrieve information about the user. For example, organic news feed stories, other content items, or other data associated with additional users or pages connected to the user are retrieved. The retrieved organic news feed stories or other data are analyzed by the news feed manager 230 to identify candidate content items, which include content having at least a threshold likelihood of being relevant to the user. For example, organic news feed stories associated with additional users not connected to the user or organic news feed stories associated with additional users for which the user has less than a threshold affinity are discarded as candidate organic news feed stories. Based on various criteria, the news feed manager 230 selects one or more of the candidate organic news feed stories for presentation to the identified user.

In various embodiments, the news feed manager 230 presents content items, including organic news feed stories, to a user through a news feed including a plurality of content items selected for presentation to the user. In some embodiments, the news feed includes a plurality of positions that are each configured to present a content item, such as a news feed story or an advertisement. The news feed may include a limited number of organic news feed stories or may include a complete set of candidate organic news feed stories. For example, the number of organic news feed stories included in a news feed may be determined in part by a user preference included in user profile store 205. The news feed manager 230 may also determine an order in which selected organic news feed stories are presented via the news feed. In one embodiment, based on the user's preference, content items presented via the news feed are presented in reverse chronological order based on timestamps associated with the content items.

The news feed manager 230 may also account for actions by a user indicating a preference for types of organic news feed stories, or other content items, and selects organic news feed stories, or other content items, having the same, or similar, types for inclusion in the news feed. Additionally, the news feed manager 230 may analyze organic news feed stories received by the social networking system 140 from various users to obtain information about user preferences or actions. Similarly, the news feed manager 230 may analyze actions associated with a user, or with additional users connected to the user, to identify user preferences for content items. This information may be used to refine subsequent selection of organic news feed stories or other content items for news feeds presented to various users.

In addition to selecting organic news feed stories for presentation via a news feed, the news feed manager 230 may select one or more advertisements for presentation to a user via the news feed. For example, a news feed presented to a user may include one or more advertisements as well as organic news feed stories. To select organic news feed stories or advertisements for presentation via a news feed, the news feed manager determines scores for the advertisements and for the organic news feed stories. In one example, a score for an advertisement is based at least in part on a bid amount associated with the advertisement, a position in the news feed in which the advertisement is to be presented, and an expected amount of interaction with the advertisement. Similarly, a score for a news feed story is based at least in part on an expected amount of interaction with the news feed story and a position in the news feed in which the news feed story is to be presented. Based on the scores associated with organic news feed stories and advertisements, the news feed manager 230 selects one or more content items for presentation. For example, the news feed manager 230 ranks organic news feed stories and advertisements based on their scores and selects organic news feed stories or advertisements for presentation based on the ranking.

One or more advertisement requests ("ad requests") are included in the ad request store 235. An advertisement request includes advertisement content (also referred to as an "advertisement") and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the social networking system 140 if advertisement content in the ad request is presented to a user, if the advertisement content in the ad request receives a user interaction when presented, or based on any other suitable condition. For example, the bid amount specifies a monetary amount that the social networking system 140 receives from the advertiser if advertisement content included in an ad request is displayed and the expected value is determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

In various embodiments, content items presented to the user via a news feed may have different heights. For example, different organic news feed stories or different advertisements vertically occupy different numbers of pixels when displayed to a user via a client device 110. Because of different dimensions of display devices used by various client devices 110 or different resolutions of display devices used by various client devices 110, heights of content items in a news feed may differ when the news feed is presented to a user by different client devices 110. The height prediction module 240 predicts a height for each content item (e.g., news feed story or advertisement). For example, the height prediction module 240 predicts a height associated with a content item based on characteristics of the content item, such as a type of content (e.g., text or image) included in the content item, a language associated with the content item, and a number of comments associated with the content item. Characteristics of a client device 110 associated with a user to whom the content item is to be presented may also be identified and used by the height prediction module 240 to predict heights associated with content items in a news feed selected for the user. For example, a client device 110 associated with the user by a user profile in the user profile store 205 is retrieved, and characteristics (e.g., display device dimensions, display device resolution) of the client device 110 are used by the height prediction module 240 to predict heights of content items for presentation to the user. As another example, a request for content received from a user may include an identifier of a client device 110, which the height prediction module 240 uses to retrieve characteristics of the client device 110 for predicting heights of content items to be presented based on the request.

In one embodiment, the height prediction module 240 trains a prediction model to predict the height associated with a content item. The prediction model may be one or more machine learned models. For example, the height prediction module 240 stores a set of features associated with a content item or with a user to be presented with the content item. The set of features may include characteristics of the content item. Example characteristics of the content item include: types of content in the content item (e.g., image, video, text), sizes of content in the content item (e.g., sizes of text, image or video data), a language used in the content item, and a number of comments associated with the content item. Features associated with the user may include a type of client device 110 associated with the user, dimensions of a display device of the client device 110, a resolution of the display device of the client device 110, and information describing applications executing on the client device 110 (e.g., a version of an application used by the client device 110 to display content items).

In one embodiment, the height prediction module 240 uses training sets of data to determine weights for the features associated with content items or with the user that are used by the prediction model. The training sets may include results of presenting content items to users that are used by the height prediction module 240 to determine weights associated with various features. For example, the height associated with a news feed story including an image when viewed by a user via a specific type of client device 110 is a result used to determine weights associated with various features. In this example, characteristics of the user and characteristics of the news feed story are used to associate weights with data from the training set, such as features associated with a news feed story having a height matching, or similar to, the height of the news feed story (e.g., a weight is associated with a type of client device 110 matching the specific type of client device 110 in the training set that is associated with a news feed story associated with a height matching the height of the presented news feed story). Weights associated with various features may be aggregated over multiple training sets to improve the accuracy of the weights. Alternatively, a height associated with advertisements including various types of content, such as images or text in a different language, may be an outcome based on the features of the type of content or the language of the content. The client device 110 associated with a user and most frequently or likely used by a user while viewing a news feed, may be another type of result from a model.

Based on the prediction model, the height prediction module 240 generates a predicted height associated with a content item (e.g., a news feed story or an advertisement). The predicted height represents the likely height of the content item when presented to the user via a client device 110. The predicted height may be expressed as a number of pixels in various embodiments. In one embodiment, the news feed manager 230 may score content items based on the predicted height value associated with the content items by the height prediction module 240. Further, the news feed manager 230 may order and select scored content items for presentation to a user via the news feed based at least in part on the predicted height values associated with the content items, as further described below in conjunction with FIGS. 3-5.

The web server 245 links the social networking system 140 via the network 120 to the one or more client devices 110, as well as to the one or more third party systems 130. The web server 140 serves web pages, as well as other web-related content, such as JAVA®, FLASH®, XML and so forth. The web server 245 may receive and route messages between the social networking system 140 and the client device 110, for example, instant messages, queued messages (e.g., email), text messages, short message service (SMS) messages, or messages sent using any other suitable messaging technique. A user may send a request to the web server 245 via the client device 110 for content items, organic news feed stories, or advertisements to be presented to the user via the news feed. Additionally, the web server 245 may provide application programming interface (API) functionality to send data directly to native client device operating systems, such as IOS®, ANDROID™, WEBOS® or BlackberryOS.

Example Presenting Content Items in a News Feed

Figure 3:
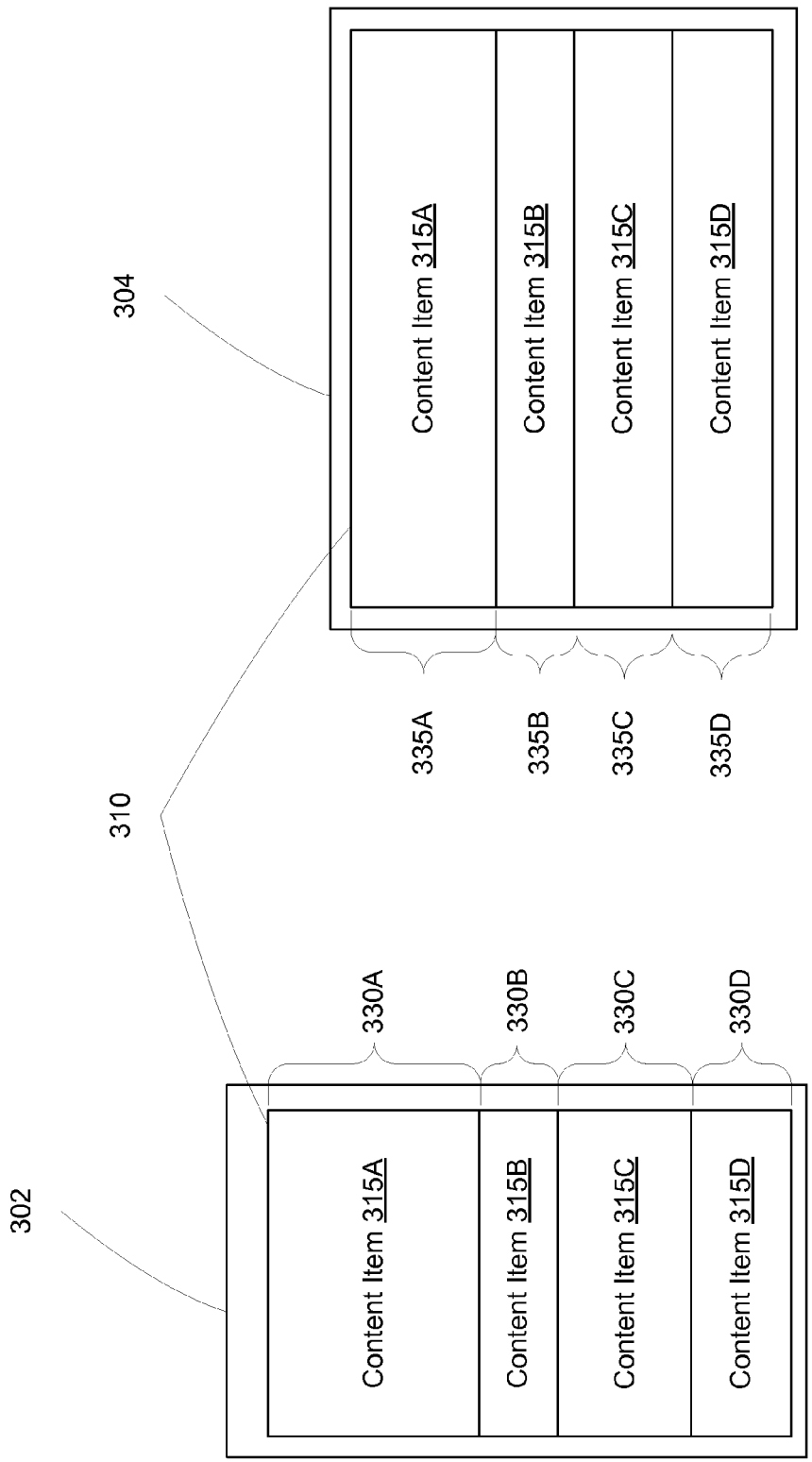
FIG. 3 is an example of presenting content in a news feed served to a user of the social networking system on different client devices, in accordance with an embodiment.

FIG. 3 shows an example presentation of content to a social networking system user via a news feed presented on different client devices 110. As used herein, "content items" refers to organic news feed stories, advertisements, or any combination thereof. In the example of FIG. 3, a news feed 310 presented to a social networking system user includes organic news feed stories and advertisements; however, in other embodiments, other types of content items may be presented via the news feed 310. The news feed 310 in FIG. 3 includes multiple content items 315A, 315B, 315C, 315D (individually and collectively referred to using reference number 315). Each content item 315 may have a different height when viewed by the user via the news feed 310. The height associated with a content item 315 represents a number of vertical pixels associated with the content item 315 when presented to the user on a client device 110. Different content items 315 may have different heights for a variety of reasons, for example, different content items 315 may include different content, such as images, text, or text language. Alternatively, different content items 315 may be associated with different numbers of comments, so the different content items 315 have different heights.

The news feed 310 may be viewed by the user on different client devices 110. In the example of FIG. 3, the news feed 310 is viewed on client device 110A and client device 110B. Content items 315 in the news feed 310 may have different heights when presented to the user on the different client devices 110 because of different dimensions of display devices of each client device or use of different applications to present the news feed 310 by different client device 110. In the example of FIG. 3, when presented to the user via client device 110A, the news feed 310 includes content items 315A, 315B, 315C, and 315D, which respectively have heights 330A, 330B, 330C, and 330D (individually and collectively referred to using reference number 330). Alternatively, in FIG. 3, when the news feed 310 is presented to the user via client device 110B content items 315A, 315B, 315C, and 315D respectively have heights 335A, 335B, 335C, and 335D (individually and collectively referred to using reference number 335).

In the example of FIG. 3, client device 110A has a display device with different dimensions than a display device of client device 110B, causing the content items 315 to have heights 330 on client device 110A and to have heights 335 on client device 110B. In some embodiments, the content items 315 may have different heights 330 and 335 when presented to a user via the same client device 110. For example, the content items 315 have heights 330 when viewed using a client device 110 oriented so its display device is in a portrait orientation having a vertical dimension larger than a horizontal dimension, and have heights 335 when viewed using the client device 110 oriented so its display device is in a landscape orientation having the vertical dimension larger than the horizontal dimension. As another example, content items 315 have different heights 330, 335 when presented using different applications executing on a client device.

The social networking system 140 may predict a height 330, 335 associated with a content item 315 when presented to a user via a client device 110 and determine a position of the content item 315 in the news feed 310 relative to other content items 315 based on the predicted height 330, 335. Use of predicted height 330, 335 to determine an order of content items 315 in the news feed 310 is further described below in conjunction with FIG. 4 and FIG. 5. For example, to enhance user interaction, the social networking system 140 may present a specified number of organic news feed stories to a user prior to providing the user with an advertisement via the news feed. To present the specified number of organic news feed stories, the social networking system 140 may determine a threshold distance (e.g., number of pixels) from an upper boundary of the news feed 310 and does not present an advertisement within the threshold distance of the upper boundary of the news feed 310. Based on the predicted heights associated with organic news feed stories, the social networking system 140 selects a number of organic news feed stories so the aggregate predicted heights of the number of organic news feed stories equals or exceeds the threshold distance. Hence, predicting heights of organic news feed stories allows the social networking system 140 to present a threshold number of organic news feed stories within a threshold distance from the upper boundary of the news feed 310 before presenting an advertisement in the news feed 310.

As another example, the social networking system 140 determines a threshold distance between advertisements presented in the news feed 310 to prevent a user from becoming inundated with advertisements in a portion of the news feed 310. The social networking system 140 determines the number of organic news feed stories to include in the threshold distance between an advertisement and an additional advertisement so an aggregate of the predicted heights of the organic news feed stories equals or exceeds the threshold distance. In some embodiments, the social networking system 140 selects organic news feed stories based in part on their predicted heights so at least a threshold number of organic news feed stories are presented in the threshold distance between an advertisement and an additional advertisement.

As the social networking system 140 presents content items in a news feed to a user, a content item displaces the content items in lower positions in the news feed based on the height of the content item. Displacing a content item may reduce user engagement with the displaced content item by causing a user to navigate through the news feed 310 to view or otherwise access the displaced content item. To prevent from impairing user interaction with the news feed 310, the social networking system 140 may score a content item in the news feed 310 based at least in part on an amount the content item displaces content items in lower positions in the news feed 310 based on the predicted height associated with the content item. Ordering presentation of content items in the news feed 310 based at least in part on their predicted heights is further described below in conjunction with FIG. 5.

Selecting Content Items for Inclusion in a News Feed

Figure 4:
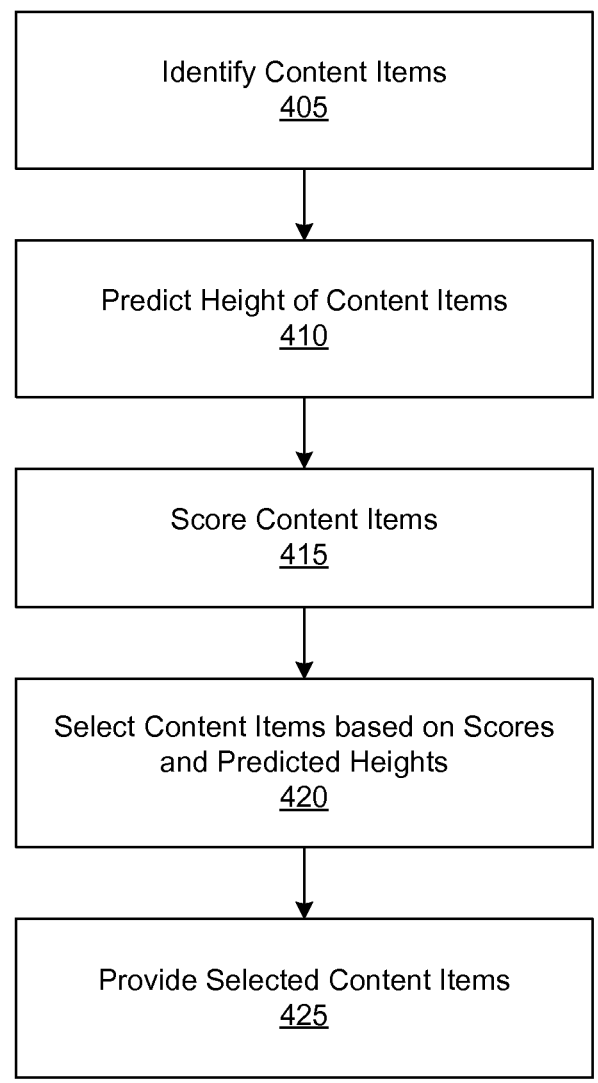
FIG. 4 is a flowchart of a method for selecting content items for presentation to a social networking system user via a news feed, in accordance with an embodiment.

FIG. 4 is a flow chart of one embodiment of a method for selecting content items for presentation to a social networking system user via a news feed. As used herein, "content items" refer to organic news feed stories, advertisements, or any combination thereof. In some embodiments, different and/or additional steps than those identified in conjunction with FIG. 4 may be performed or the steps described in conjunction with FIG. 4 may be performed in different orders.

The social networking system identifies 405 one or more content items for presentation to a user via the news feed. For example, new organic news feed stories are generated by the news feed manager 230 and maintained in a queue for presentation to the user. One or more organic news feed stories may be identified 405 from this queue as content items for inclusion in the news feed. Identification of organic news feed stories is further described in U.S. patent application Ser. No. 14/031,453, filed on Sep. 19, 2013, which is hereby incorporated by reference in its entirety. In another example, the social networking system 140 identifies 405 content items stored in the content store 210 or actions stored in the action log 220 associated with additional users for which the user has greater than a threshold affinity. Additionally, one or more advertisements included in the ad request store 235 may be identified 405 as content items. For example, advertisements associated with at least a threshold number of targeting criteria satisfied by the user are identified 405 from the ad request store 235 as content items for inclusion in the news feed.

The social networking system 140 predicts 410 a height associated with each of the identified content items based at least in part on characteristics of the identified content item. In various embodiments, the predicted height of a content item represents a number of pixels along a vertical axis used to present the content item via a client device 110. For example, the social networking system 140 predicts 410 a height value associated with a content item based on the content, such as a type of content (e.g., image, text, video) included in the content item, a language of the content item, and a number of comments associated with the content item. Additionally, characteristics of a client device 110 associated with the user to whom the content item is to be presented may also be used to predict 410 the height associated with the content item. Example characteristics of a client device 110 used to predict 410 the height of a content item include dimensions of a display device of the client device 110, a resolution of the display device of the client device 110, and a type of application used by the client device 110 to present the content item. As described above in conjunction with FIG. 2, the social networking system 140 may use one or more machine learned models to predict 410 heights of various content items.

Based at least in part on expected user interaction with the identified content items, the social networking system 140 scores 415 the identified content items. In some embodiments, the social networking system 140 differently scores 415 different types of content items. For example, organic news feed stories and advertisements are differently scored 415. In one embodiment, the social networking system 140 scores 415 a news feed story based on an expected amount of user interaction with a news feed story, which provides a measure of the probability of the user interacting with the news feed story. The expected amount of interaction may be based on an organic value associated with a news feed story; determining an organic value associated with a news feed story is further described in U.S. patent application Ser. No. 12/978,265, filed on Dec. 23, 2010, and U.S. patent application Ser. No. 13/545,266, filed on Jul. 10, 2012, each of which is hereby incorporated by reference in its entirety.

In some embodiments, the social networking system 140 scores 415 an advertisement based at least in part on a bid amount associated with the advertisement and an expected amount of user interaction with the advertisement. The social networking system 140 retrieves the bid amount associated with an advertisement from an ad request associated with the advertisement stored in the ad request store 235. A conversion factor may be applied to one or more of the bid amount and the expected amount of user interaction with the advertisement by the social networking system 140 to score 415 the advertisement. Combining a bid amount and an expected amount of user interaction is further described in U.S. patent application Ser. No. 13/545,266, filed on Jul. 10, 2012, which is hereby incorporated by reference in its entirety.

The social networking system 140 may account for a predicted height associated with a content item when scoring 415 the content item. For example, a score associated with a content item having a predicted height greater than a threshold value is reduced, while a score associated with content item having a predicted height less than the threshold value is increased. The social networking system 140 may reduce scores associated with advertisements having greater than a threshold predicted height.

Based on the scores and predicted heights associated with content items, the social networking system 140 selects 420 one or more content items for presentation to the user via the news feed. In one embodiment, the social networking system 140 ranks the content items based on their associated scores and selects 420 content items based on their associated rank. For example, scores associated with organic news feed stories and scores associated with advertisements are converted into a common unit of measurement, and advertisements and organic news feed stories are together ranked in a single ranking, as further described in U.S. patent application Ser. No. 13/545,266, filed on Jul. 10, 2012, which is hereby incorporated by reference in its entirety. Alternatively, organic news feed stories and advertisements are separately ranked based on their associated scores. Based on the ranking, the social networking system 140 selects 420 one or more content items for presentation to the user via the news feed. For example, content items having at least a threshold position in a ranking are selected 420.

Content items may be selected 420 using one or more rules based at least in part on predicted heights associated with content items. The one or more rules may also be based in part on a type associated with various content items. For example, a rule specifies a minimum number of content items to present within a threshold distance in a vertical dimension of the news feed, so the social networking system 140 selects 420 a number of content items based at least in part on their scores and their predicted heights so an aggregate of the predicted heights of the number of content items is less than or equal to the threshold vertical distance. In one embodiment, the threshold vertical distance is a distance from an upper boundary of the news feed.

One or more rules used to select 420 content items may be based on types associated with content items. For example, a rule specifies a threshold distance in a vertical dimension of the news feed between an upper boundary of the news feed and an initial advertisement presented in the news feed. When selecting 420 content items, the social networking system 140 initially selects 420 a number of content items that are organic news feed stories so an aggregation of the predicted heights of the number of content items that are organic news feed stories equals or exceeds the threshold distance. After the aggregated predicted heights of the selected organic news feed stories satisfies the threshold distance, the social networking system 140 identifies content items that are advertisements as eligible to be selected 420 and may select 420 an advertisement based on scores associated with advertisements. For example, the social networking system 140 selects 420 organic news feed stories having the highest relative scores to other organic news feed stories then determines whether an aggregation of the predicted heights of the organic news feed stories equals or exceeds the threshold distance. If the aggregation of the predicted heights or the organic news feed stories is less than the threshold distance, the social networking system 140 selects 420 alternative organic news feed stories based on their scores and their predicted heights. For example, the social networking system 140 may select alternative organic news feed stories having lower scores but larger predicted heights, or may maintain organic news feed stories having maximum scores and select 420 alternative organic news feed stories having lower scores and larger predicted heights than originally selected 420 organic news feed stories.

As another example, after selecting 420 a news feed story having a maximum score relative to other organic news feed stories, the social networking system determines a difference between the threshold distance and the predicted height of the selected news feed story, the determined difference is used along with scores and predicted heights to select 420 additional organic news feed stories until the aggregation of the predicted heights of the selected organic news feed stories equals or exceeds the threshold distance. In some embodiments, a rule also specifies a minimum number of organic news feed stories to present in the threshold distance between the upper boundary of the news feed and the initial advertisement, so the social networking system 140 selects 420 organic news feed stories based on their scores and predicted heights so at least the threshold number of organic news feed stories are selected and the total of the predicted heights of the selected organic news feed stories equals or exceeds the threshold distance; hence, the social networking system 140 selects 420 at least the threshold number of organic news feed stories so a combination of the predicted heights of the selected organic news feed stories equals or exceeds the threshold distance. For example, if the predicted height associated with a news feed story having a second highest score is greater than the difference between the threshold distance and the predicted height of the selected news feed story having the maximum score, the social networking system 140 selects 420 a news feed story having a third highest score if the news feed story having the third highest score is associated with a predicted height less than the difference between the threshold distance and the predicted height of the selected news feed story having the maximum score relative to the other organic news feed stories. The social networking system 140 may repeat this process until the threshold number of organic news feed stories is selected 420 for presentation in the threshold distance between the upper boundary of the news feed and the initial advertisement presented in the news feed.

Another rule used by the social networking system 140 when selecting 420 content items may specify a threshold distance in a vertical dimension of the feed between advertisements presented in the news feed. Hence, after selecting 420 an advertisement for presentation via the news feed, the social networking system 420 selects content items other than advertisements, such as organic news feed stories, based on their scores. When an aggregation of the predicted heights of selected content items other than advertisements selected 420 by the social networking system equals or exceeds the threshold distance, the social networking system 420 determines advertisements are again eligible for selection for presentation via the news feed. Alternatively, the social networking system 140 selects 420 organic news feed stories, or other content items, based on their scores and predicted heights, so an aggregate of the predicted heights of the selected content items equals or exceeds the threshold distance then selects 420 an advertisement for presentation via the news feed. In some embodiments, a rule specifies a minimum number of organic news feed stories, or other content items, for presentation using the threshold distance between advertisements, so the social networking system 140 selects content items for presentation in the threshold distance based on their scores and predicted heights as described above. The threshold distance between consecutive advertisements presented via the news feed may be determined by the social networking system 140 based at least in part on predicted heights of one or more advertisements, such as advertisements having at least a threshold score or having a threshold position in a ranking.

After selecting 420 content items for presentation via the news feed, the social networking system 140 provides 425 the selected content items to a client device 110 associated with the user for presentation via the news feed. In various embodiments, the selected content items are provided 425 to the client device 110 in response to a request for content items received by the social networking system 140. Alternatively, the social networking system 140 provides 425 the selected content items to the client device 110 at periodic intervals or pushes the selected content items to the client device 110 when they are selected 420.

While FIG. 4 shows an example where the social networking system 140 predicts 410 heights of content items prior to selecting 420 content items for inclusion in the news feed, in other embodiments, the social networking system 140 initially scores 415 content items and selects 420 a set of candidate content items based at least in part on the scores. Heights are then predicted 410 for each of the candidate content items in the set, and the social networking system 140 selects 425 candidate content items from the set for presentation via the news feed based at least in part on the predicted heights of the candidate content items as well as the scores of the candidate content items, as further described above. Predicting 410 heights of candidate content items after selecting the candidate content items allows the social networking system 140 to conserve computing resources by predicting 410 heights for a smaller number of content items.

Ordering Content Items for Presentation in a News Feed

Figure 5:
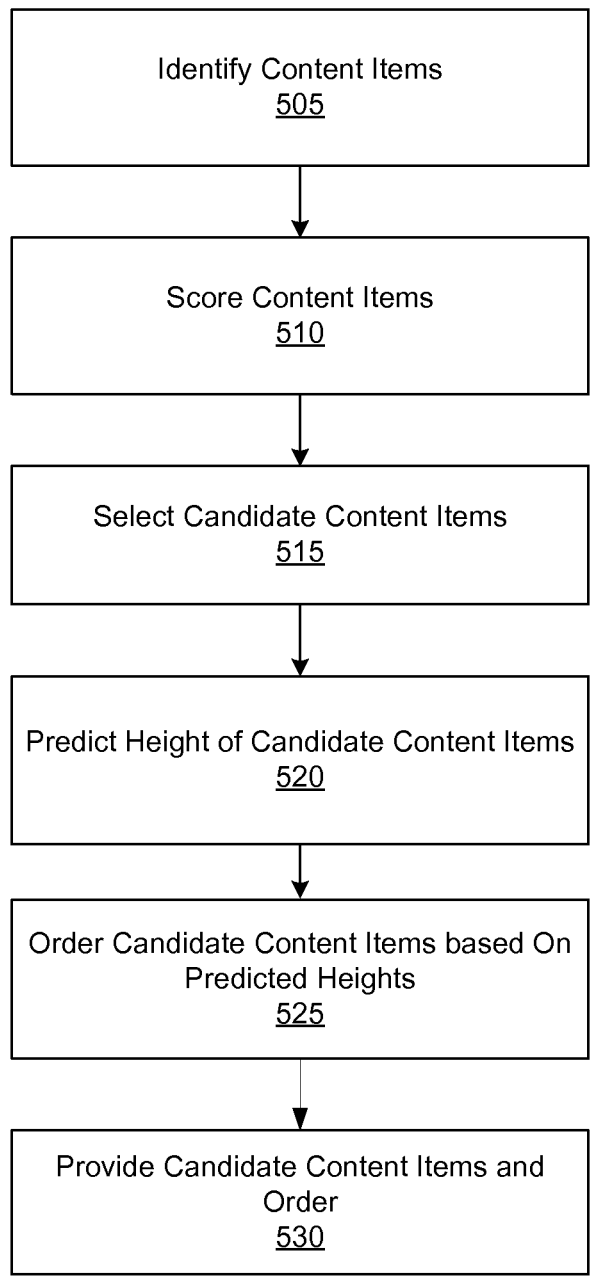
FIG. 5 is a flowchart of a method for ordering selected content items to be presented to a social networking system user via a news feed, in accordance with an embodiment.

FIG. 5 is a flow chart of one embodiment of a method for ordering content items selected for presentation to be presented to a social networking system user in a news feed. As used herein, "content items" refer to organic news feed stories, advertisements, or any combination thereof. In some embodiments, different and/or additional steps than those identified in conjunction with FIG. 4 may be performed or the steps described in conjunction with FIG. 4 may be performed in different orders.

The social networking system identifies 505 one or more content items for presentation to a user via the news feed. For example, new organic news feed stories are generated by the news feed manager 230 and maintained in a queue for presentation to the user. One or more organic news feed stories may be identified 505 from this queue as content items for inclusion in the news feed. Identification of organic news feed stories is further described in U.S. patent application Ser. No. 14/031,453, filed on Sep. 19, 2013, which is hereby incorporated by reference in its entirety. In another example, the social networking system 140 identifies 505 content items stored in the content store 210 or actions stored in the action log 220 associated with additional users for which the user has greater than a threshold affinity. Additionally, one or more advertisements included in the ad request store 235 may be identified 505 as content items. For example, advertisements associated with at least a threshold number of targeting criteria satisfied by the user are identified 505 from the ad request store 235 as content items for inclusion in the news feed.

Based at least in part on expected user interaction with the identified content items, the social networking system 140 scores 510 the identified content items. In some embodiments, the social networking system 140 differently scores 510 different types of content items. For example, organic news feed stories and advertisements are differently scored 510. In one embodiment, the social networking system 140 scores 510 a news feed story based on an expected amount of user interaction with a news feed story, which provides a measure of the probability of the user interacting with the news feed story. The expected amount of interaction may be based on an organic value associated with a news feed story; determining an organic value associated with a news feed story is further described in U.S. patent application Ser. No. 12/978,265, filed on Dec. 23, 2010, and U.S. patent application Ser. No. 13/545,266, filed on Jul. 10, 2012, each of which is hereby incorporated by reference in its entirety.

In some embodiments, the social networking system 140 scores 510 an advertisement based at least in part on a bid amount associated with the advertisement and an expected amount of user interaction with the advertisement. The social networking system 140 retrieves the bid amount associated with an advertisement from an ad request associated with the advertisement stored in the ad request store 235. A conversion factor may be applied to one or more of the bid amount and the expected amount of user interaction with the advertisement by the social networking system 140 to score 510 the advertisement. Combining a bid amount and an expected amount of user interaction is further described in U.S. patent application Ser. No. 13/545,266, filed on Jul. 10, 2012, which is hereby incorporated by reference in its entirety.

Based on the scores, the social networking system 140 selects 515 a set of candidate content items for presentation via the news feed. In one embodiment, the social networking system 140 ranks the content items based on their associated scores and selects 515 the set of candidate content items based on their associated rank. For example, scores associated with organic news feed stories and scores associated with advertisements are converted into a common unit of measurement, and advertisements and organic news feed stories are together ranked together in a single ranking, as further described in U.S. patent application Ser. No. 13/545,266, filed on Jul. 10, 2012, which is hereby incorporated by reference in its entirety. Content items having at least a threshold position in the ranking are selected 515 as candidate content items. Alternatively, organic news feed stories and advertisements are separately ranked based on their associated scores. Based on the ranking, the social networking system 140 selects 515 one or more content items as candidate content items. For example, content items having at least a threshold position in the ranking are selected 515 as candidate content items.

The social networking system 140 also predicts 520 heights associated with each of the candidate content items in the set of candidate content items based at least in part on characteristics of the identified content item. In various embodiments, the predicted height of a candidate content item represents a number of pixels along a vertical axis used to present the content item via a client device 110. For example, the social networking system 140 predicts 520 a height value associated with a candidate content item based on the content, such as a type of content (e.g., image, text, video) included in the content item, a language of the content item, and a number of comments associated with the content item. Additionally, characteristics of a candidate client device 110 associated with the user to whom the content item is to be presented may also be used to predict 520 the height associated with the candidate content item. Example characteristics of a client device 110 used to predict 520 the height of a candidate content item include dimensions of a display device of the client device 110, a resolution of the display device of the client device 110, and a type of application used by the client device 110 to present the candidate content item. Prediction of heights associated with candidate content items is further described above in conjunction with FIGS. 2 and 4.

Based on the predicted height values associated with the selected content items the social networking system 140 orders 525 the candidate content items for presentation via the news feed. In one example, the social networking system 140 orders 525 candidate content items so candidate content items associated with less than a threshold height have higher positions in the news feed than candidate content items associated with greater than the threshold height. In another example, the social networking system 140 orders 525 the candidate content items based at least in part on the predicted heights associated with various candidate content items. A type associated with the candidate content items may be used along with the predicted heights when ordering 525 the candidate content items. For example, candidate content items that are advertisements are ordered 525 so they are greater than a threshold distance from an upper boundary of the news feed. In one embodiment, the social networking system 140 orders 525 candidate content items so a combination of predicted heights of candidate content items that are not advertisements equals or exceeds the threshold distance before an initial advertisement is included in the news feed. A threshold number of content items, such as organic news feed stories, may be included in the threshold distance between the initial advertisement and the upper boundary of the news feed when ordering 525 the candidate content items. Selection of content items based on predicted heights and threshold distances is further described above in conjunction with FIG. 4.

In some embodiments, the social networking system 140 determines a value to the social networking system 140 of presenting a candidate content item in different positions of the news feed. The value is based in part on the score of the candidate content and provides a measure of an expected amount of interaction with the content item when presented in a position of the news feed. Additionally, the value accounts for a decrease in value to the social networking system from positioning additional candidate content items in positions of the news feed below the position in which the candidate content item is presented. To account for the decrease in value from presenting the additional candidate content items in positions below the position in which the candidate content item is presented, the social networking system 140 applies a position discount to the value of the presenting the candidate content in the position of the news feed. A position discount value is associated with a position in the news feed and reflects a predicted decrease in user interaction with a content item based on the position of the content in the news feed. When a news feed is presented to a user, the likelihood of a user interacting with a content item presented via the news feed varies depending on the position in the news feed in which the content item is presented. Positions of the news feed may be determined based on a distance between the content item and a reference position, such as an upper boundary of the news feed. For example, a user has a higher likelihood of interacting with content items presented in positions within a threshold distance from an upper boundary (or "top") of the news feed than of interacting with content items presented in positions greater than the threshold distance from the news feed. The position discount value associated with a content item may be based at least in part on a distance between the content item and a reference position in the news feed, such as the upper boundary of the news feed. For example, different position discounts are associated with different distances between a content item and the upper boundary of the news feed, so a distance between the content item and the upper boundary determines the position discount applied to a score associated with the content item. Determining a position discount value associated with a position in a news feed is further described in U.S. patent application Ser. No. 14/049,429, filed on Oct. 9, 2013, which is hereby incorporated by reference in its entirety.

When ordering 525 the candidate content items, the social networking system 140 determines values for presenting a candidate content item in different positions of the news feed based on the score associated with the candidate content item modified by position discounts based on distances between the candidate content item and an upper boundary of the news feed. The position discount may be determined based on the predicted heights of one or more additional candidate content items, such as additional candidate content items presented nearer to the upper boundary of the news feed (i.e., predicted heights of additional candidate content items in higher positions of the news feed). For example, predicted heights of one or more additional candidate content items are combined, with a position discount for presenting a candidate content item lower in the news feed than the additional candidate content items determined based on the combined predicted heights and applied to a score for the candidate content item to determine a value for the candidate content item. Values for various candidate content items presented different distances from the upper boundary of the news feed are determined, and the social networking system 140 orders 525 the candidate content items to maximize an aggregation of the values of the candidate content items. For example, the social networking system 140 determines a value for a candidate content item presented a distance from a reference location using a position discount associated with the distance and one or more alternative values for the content item presented in alternative locations from the reference location based on alternative position discounts associated with the alternative locations. The value and alternative values are stored in association with the content item and the distance and alternative distances. As the position discounts are based on a distance between a content item and the upper boundary of the news feed (or any other suitable reference location), the position discount used to determine a value for presenting a candidate content item is determined based on an aggregation of predicted heights of additional candidate content items presented nearer to the upper boundary of the news feed than the candidate content item. In some embodiments, the social networking system 140 orders 525 the selected content items so a combination of the values associated with content items and distances from the reference location is maximized.

After selecting 420 content items for presentation via the news feed, the social networking system 140 provides 425 the selected content items to a client device 110 associated with the user for presentation via the news feed. In various embodiments, the selected content items are provided 425 to the client device 110 in response to a request for content items received by the social networking system 140. Alternatively, the social networking system 140 provides 425 the selected content items to the client device 110 at periodic intervals or pushes the selected content items to the client device 110 when they are selected 420.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   identifying a set of candidate content items maintained by a social networking system for presentation to a user of the social networking system in a feed of content items;
   determining a score for each of the plurality of content items, the score associated with a content item based at least in part on an expected amount of user interaction with the content item;
   selecting a set of candidate content items for presentation to the user based at least in part on the scores;
   predicting a height of each candidate content item in the set of candidate content items based at least in part on characteristics of candidate content items in the set of candidate content items;
   determining values for presenting each candidate content item, a value associated with a candidate content item based at least in part on a score for the candidate content item modified by a position discount based at least in part on a distance between the candidate content item and a reference position of the feed determined by predicted heights of one or more additional candidate content items;
   ordering the set of candidate content items based at least in part on the values; and
   providing the order and the set of candidate content items to a client device for presentation to the user via the feed.

2. The computer-implemented method of claim 1, wherein the reference position comprises an upper boundary of the feed.

3. The computer-implemented method of claim 1, wherein determining values for presenting each candidate content item comprises:
   determining a plurality of values for each candidate content item associated with a plurality of distances between the candidate content item and the reference position of the feed based on position discounts associated with different distances between the candidate content item and the reference position of the feed.

4. The computer-implemented method of claim 3, wherein determining the plurality of values for each candidate content item associated with a plurality of distances between the candidate content item and the reference position of the feed comprises:
   determining the distance between the candidate content item and the reference position based on predicted heights associated with one or more additional candidate content items;
   determining a position discount associated with the distance;
   determining the value associated with the candidate content item based on the score for the candidate content item and the determined position discount; and
   storing the value in association with the distance and with the candidate content item.

5. The computer-implemented method of claim 4, wherein determining the plurality of values for each candidate content item associated with a plurality of distances between the candidate content item and the reference position of the feed further comprises:
   determining an alternative distance between the candidate content item and the reference position based on predicted heights associated with one or more alternative additional candidate content items;
   determining an alternative position discount associated with the alternative distance;
   determining an alternative value associated with the candidate content item based on the score for the candidate content item and the determined alternative position discount; and
   storing the value in association with the alternative distance and with the candidate content item.

6. The computer-implemented method of claim 1, wherein ordering the set of candidate content items based at least in part on the values comprises:
   determining distances between candidate content items in the set of candidate content items and the reference position of the feed so a combination of the values for candidate content items for distances between the candidate content items is maximized.

7. The computer-implemented method of claim 1, wherein characteristics of the candidate content item are selected from a group consisting of: a type of content included in the candidate content item, a language associated with the candidate content item, a number of comments associated with the candidate content item, and any combination thereof.

8. The computer-implemented method of claim 1, wherein predicting a height of each candidate content item in the set of candidate content items based at least in part on characteristics of candidate content items in the set of candidate content items comprises:
   determining the client device associated with the user;
   retrieving characteristics of the client device; and
   predicting the height of each candidate content item in the set of candidate content items based at least in part on characteristics of candidate content items in the set of candidate content items and based at least in part on the characteristics of the client device.

9. The computer-implemented method of claim 8, wherein the characteristics of the client device are selected from a group consisting of: one or more dimensions of a display device of the client device, a resolution of the display device of the client device, a type of application used by the client device to present the feed, and any combination thereof.

10. The computer-implemented method of claim 1, wherein a predicted height of the candidate content item comprises a number of pixels along a vertical axis of the feed used to present the candidate content item.

11. A computer program product comprising a non-transitory computer readable storage medium having instructions encoded thereon that, when executed by a processor, cause the processor to:
   identify a set of candidate content items maintained by a social networking system for presentation to a user of the social networking system in a feed of content items;
   determine a score for each of the plurality of content items, the score associated with a content item based at least in part on an expected amount of user interaction with the content item;
   select a set of candidate content items for presentation to the user based at least in part on the scores;
   predict a height of each candidate content item in the set of candidate content items based at least in part on characteristics of candidate content items in the set of candidate content items;
   determine values for presenting each candidate content item, a value associated with a candidate content item based at least in part on a score for the candidate content item modified by a position discount based at least in part on a distance between the candidate content item and a reference position of the feed determined by predicted heights of one or more additional candidate content items;
   order the set of candidate content items based at least in part on the values; and
   provide the order and the set of candidate content items to a client device for presentation to the user via the feed.

12. The computer program product of claim 11, wherein the reference position comprises an upper boundary of the feed.

13. The computer program product of claim 11, wherein determine values for presenting each candidate content item comprises:
   determine a plurality of values for each candidate content item associated with a plurality of distances between the candidate content item and the reference position of the feed based on position discounts associated with different distances between the candidate content item and the reference position of the feed.

14. The computer program product of claim 13, wherein determine the plurality of values for each candidate content item associated with a plurality of distances between the candidate content item and the reference position of the feed comprises:
   determine the distance between the candidate content item and the reference position based on predicted heights associated with one or more additional candidate content items;
   determine a position discount associated with the distance;
   determine the value associated with the candidate content item based on the score for the candidate content item and the determined position discount; and
   store the value in association with the distance and with the candidate content item.

15. The computer program product of claim 14, wherein determine the plurality of values for each candidate content item associated with a plurality of distances between the candidate content item and the reference position of the feed further comprises:
   determine an alternative distance between the candidate content item and the reference position based on predicted heights associated with one or more alternative additional candidate content items;
   determine an alternative position discount associated with the alternative distance;
   determine an alternative value associated with the candidate content item based on the score for the candidate content item and the determined alternative position discount; and
   store the value in association with the alternative distance and with the candidate content item.

16. The computer program product of claim 11, wherein order the set of candidate content items based at least in part on the values comprises:
   determine distances between candidate content items in the set of candidate content items and the reference position of the feed so a combination of the values for candidate content items for distances between the candidate content items is maximized.

17. The computer program product of claim 11, wherein characteristics of the candidate content item are selected from a group consisting of: a type of content included in the candidate content item, a language associated with the candidate content item, a number of comments associated with the candidate content item, and any combination thereof.

18. The computer program product of claim 11, wherein predict a height of each candidate content item in the set of candidate content items based at least in part on characteristics of candidate content items in the set of candidate content items comprises:
   determine the client device associated with the user;
   retrieve characteristics of the client device; and
   predict the height of each candidate content item in the set of candidate content items based at least in part on characteristics of candidate content items in the set of candidate content items and based at least in part on the characteristics of the client device.

19. The computer program product of claim 18, wherein the characteristics of the client device are selected from a group consisting of: one or more dimensions of a display device of the client device, a resolution of the display device of the client device, a type of application used by the client device to present the feed, and any combination thereof.

20. The computer program product of claim 11, wherein a predicted height of the candidate content item comprises a number of pixels along a vertical axis of the feed used to present the candidate content item.

* * * * *